(12) United States Patent
Balazs et al.

(10) Patent No.: US 11,929,471 B2
(45) Date of Patent: Mar. 12, 2024

(54) METHOD AND DEVICE FOR DETECTING A THERMAL RUNAWAY IN A BATTERY MODULE

(71) Applicant: Rolls-Royce Deutschland Ltd & Co KG, Blankenfelde-Mahlow (DE)

(72) Inventors: Gergely György Balazs, Budapest (HU); Kristian Fenech, Budapest (HU); Akos Hegedus, Budapest (HU)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 469 days.

(21) Appl. No.: 17/296,222

(22) PCT Filed: Nov. 22, 2019

(86) PCT No.: PCT/EP2019/082232
§ 371 (c)(1),
(2) Date: May 21, 2021

(87) PCT Pub. No.: WO2020/104658
PCT Pub. Date: May 28, 2020

(65) Prior Publication Data
US 2022/0021037 A1    Jan. 20, 2022

(30) Foreign Application Priority Data
Nov. 22, 2018    (EP) .................... 18207712

(51) Int. Cl.
*H01M 10/48*    (2006.01)
*H01M 10/42*    (2006.01)

(52) U.S. Cl.
CPC ....... *H01M 10/482* (2013.01); *H01M 10/486* (2013.01); *H01M 10/488* (2013.01); *H01M 2010/4271* (2013.01); *H01M 2220/20* (2013.01)

(58) Field of Classification Search
CPC ............ H01M 10/482; H01M 10/486; H01M 10/488; H01M 2010/4271; H01M 2220/20; Y02E 60/10
(Continued)

(56) References Cited

U.S. PATENT DOCUMENTS

| | | |
|---|---|---|
| 2011/0298626 A1 | 12/2011 | Fechalos et al. |
| 2015/0280294 A1* | 10/2015 | Shin .................... H01M 10/482 429/50 |
| 2023/0207952 A1* | 6/2023 | Skroski ............... H01M 10/486 429/54 |

FOREIGN PATENT DOCUMENTS

| | | |
|---|---|---|
| EP | 2560073 A1 | 2/2013 |
| EP | 3376585 A1 | 9/2018 |

OTHER PUBLICATIONS

European Search Report for European Application No. 18207712.3-1108 dated May 7, 2019.
(Continued)

*Primary Examiner* — Paul Dinh
(74) *Attorney, Agent, or Firm* — Lempia Summerfield Katz LLC

(57) ABSTRACT

A device for detecting a thermal runaway of a battery module with a number of cells includes a current acquisition module that is configured to capture a set of currents, and a temperature acquisition module that is configured to capture a set of temperatures. The device includes a state of charge capturing module that is configured to capture a set of states, and a resistance calculation module that is configured to derive a set of resistances. The device includes a temperature prediction module that is configured to calculate a set of temperature predictors, and a runaway prediction module that is configured to calculate a set of runaway predictors. A warning module that is configured to set a warning indicator (Continued)

when at least one runaway predictor value of the set of runaway predictors exceeds a predefined threshold value.

17 Claims, 4 Drawing Sheets

(58) Field of Classification Search
USPC .......................................................... 320/134
See application file for complete search history.

(56) References Cited

OTHER PUBLICATIONS

International Search Report and the Written Opinion for International Patent Application PCT/EP2019/082232 dated Jan. 3, 2020.

* cited by examiner

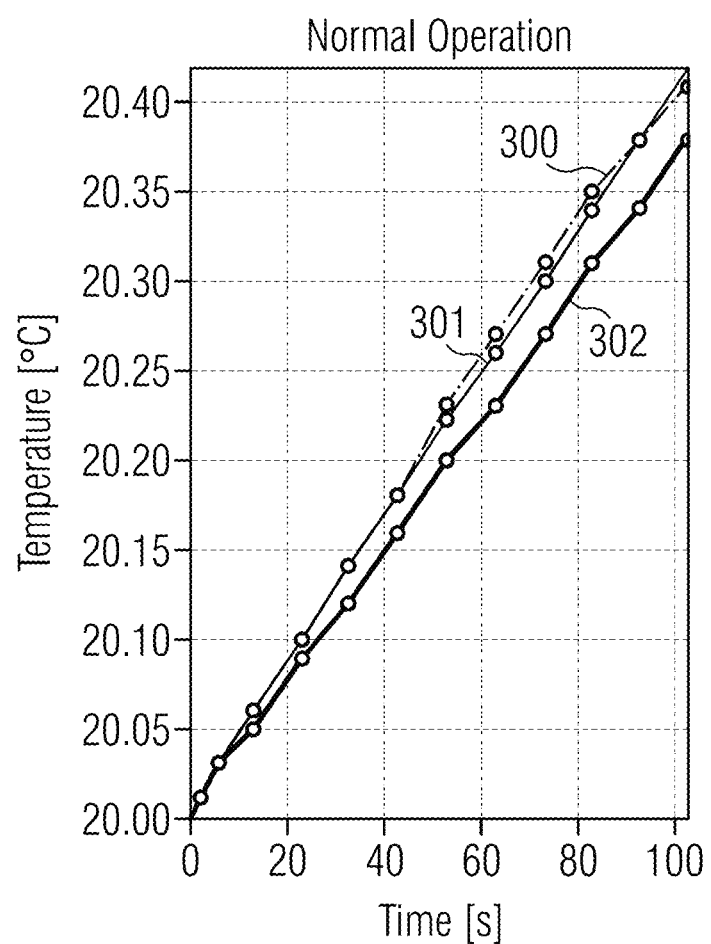

METHOD AND DEVICE FOR DETECTING A THERMAL RUNAWAY IN A BATTERY MODULE

This application is the National Stage of International Application No. PCT/EP2019/082232, filed Nov. 22, 2019, which claims the benefit of European Patent Application No. EP 18207712.3, filed Nov. 22, 2018. The entire contents of these documents are hereby incorporated herein by reference.

BACKGROUND

The present embodiments relate to a method and a device for detecting a thermal runaway in a battery module.

Energy storage devices such as batteries (e.g., Lithium-Ion batteries) are inherently prone to the risk of a "thermal runaway".

Li-ion Battery cells typically are electrically connected in parallel and in series in stacks to reach the voltage and current on battery module level required by the specific application. The thermal runaway in a battery module may be triggered by an internal short circuit or alternatively by over-temperature caused by over-current or external heat. The over current typically may occur due to an external short circuit in or outside the battery module.

The common characteristic of thermal runaway events in Li-Ion battery cells, independent of the triggering event is that the separator starts to melt in a growing area, and the resulting current increase generates even more heat around the defect and so on. The result is excessive heat generation, pressure, temperature increase, and finally explosion.

One single thermal runaway may cause other, typically neighboring cells to overheat in a domino-effect (e.g., cascading thermal runaway events may occur).

Such a propagation of thermal runaway inside the battery module may potentially lead to a catastrophic event depending on the application and other circumstances such as environmental parameters (e.g., electric/hybrid vehicles such as cars, aircraft, ships, or back-up battery modules for buildings, etc.). For example, fire, smoke, explosion, or hazardous chemical leakage may take place.

Techniques to minimize the effect of a thermal runaway are known. Disadvantageously, these methods add additional weight to each battery pack and may significantly impact the performance of a flight vehicle.

In prior art, predicting thermal runaway events is based, for example, on a threshold comparison of temperatures, where temperature sensors are placed on a number of battery cells, or on a temperature prediction using pre-measured values stored in a look-up table in the measuring device memory. An example of such a look-up table approach is shown in the EP2560073A1 patent application publication.

To minimize the harm of a thermal runaway, a number of physical improvements at cell and module level may be considered to reduce the damage caused by a thermal runaway event.

At cell level, for example, a safety vent or a steel container may be provided. Further, a pressure triggered electrical switch may interrupt the current through a cell.

At module level, for example, a structural foam, a heat resistant paper barrier (e.g., a mica sheet), a gap, or a distance between the cells may be considered to design a lower energy density, or fuses may be integrated where possible (e.g., between parallel cells or in series with cells).

However, these measures for harm minimization come along with additional costs, weight, and size of the detection device and/or battery module. Further, the time for detecting a thermal runaway is for some dedicated applications not short enough.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the prior art may be improved in the handling of thermal runaway events.

A method includes, on a continuing basis, for each point in time, capturing a set of currents that includes a respective cell current value for each cell of the number of cells. A set of temperatures that includes at least one temperature value is captured within the battery module, and a set of states that includes a respective state of charge value for each cell of the number of cells is derived. A set of resistances including a respective cell resistance value for each cell of the number of cells is derived using the temperature values of the set of temperatures and using the state of charge values of the set of states, and a set of temperature predictors that includes at least one temperature prediction value that is estimated for a location within the battery module is calculated using the set of currents and the set of resistances. A set of runaway predictors that includes a respective runaway predictor value for each cell of the number of cells is calculated using the set of currents, the set of temperatures, the set of resistances, and the set of temperature predictors. A warning indicator is set in the case when at least one runaway predictor value of the set of runaway predictors exceeds a predefined threshold value.

The method according to the present embodiments is suitable to predict a thermal runaway in a battery module before full on-set. Thus, a domino-effect of thermal runaway may be prevented, slowed down, or predicted when succeeding appropriate interventions are applied timely.

When applying the method according to the present embodiments, a fast, accurate, and reliable detection may be achieved even if a low number of sensors is used. The detection may be performed with low time delay and high probability.

Moreover, the exact location of the thermal runaway within the battery module may be determined. In addition, the occurrence of false alarms may be minimized.

The advantages arise since the model takes spatial and dynamic information originating from thermal, electric, and electrochemical parameters into account to build a prediction model, beside the actual temperature- and current-profile.

The present embodiments may prevent damage and potential physical harm.

Capturing the set of currents and/or the set of temperatures may be performed, for example, by a direct or indirect respective measurement.

It is beneficial if the set of temperatures includes at least two temperature values that are measured at different locations within the battery module, and, in one embodiment, the set of temperatures may include one temperature value for each cell of the number of cells that is measured at or near to the respective cell within the battery module. Thus, a high precision of the prediction of a thermal runaway is achieved.

In a further development of the present embodiments, the temperature predictor value is calculated based on the relation $$T_{P,i} = T_{0,i} + \frac{1}{mC_p} \int_{t_0}^{t} I_M^2(i, t')R(i, t')dt'$$

In the formula, the parameter i is a location index value of a location (e.g., of a single cell of the number of cells).

The parameter $T_{P,i}$ denotes the temperature predictor value of the set of temperature predictors at the location with the location index i.

The parameter $T_{0,i}$ denotes the initial temperature value of the set of initial temperatures at the location with the location index i.

The parameter m refers to the mass subject of the load.

The parameter $C_p$ identifies the average specific heat value at the location with the location index i.

Heat capacity or thermal capacity is a measurable physical quantity equal to the ratio of the heat added to or removed from an object to the resulting temperature change. Heat capacity is an extensive property of matter, providing that it is proportional to the size of the system. When expressing the same phenomenon as an intensive property, the heat capacity is divided by the amount of substance, mass, or volume, and thus, the quantity is independent of the size or extent of the sample. The molar heat capacity is the heat capacity per unit amount of a pure substance, and the specific heat capacity (e.g., simply specific heat) is the heat capacity per unit mass of a material.

The parameter $I_M(i,t)$ is the measured current value of the set of currents at the location with the location index i and time t.

The parameter $R_M(i,t)$ is the measured resistance value of the set of resistances at the location with the location index i and time t.

The parameter $T_P$ is in the range $[T_1 \ldots T_N] \in \mathbb{R}^N$, and $T_0 \in \mathbb{R}^N$.

Thus, the temperature predictor value is calculated in a simple, efficient, and accurate manner at the same time.

In a further development of the present embodiments, the runaway predictor value is calculated based on the general relation $$P(TR \mid x_1, x_2) = \frac{e^{\beta_0 + \beta_1 x_1 + \beta_2 x_2}}{1 + e^{\beta_0 + \beta_1 x_1 + \beta_2 x_2}}$$

In the formula, the parameter TR indicates a thermal runaway as the probability of interest.

The parameter $x_1$, $x_2$ denotes given predictors, inferred from the set of temperature predictors.

The parameter $P(TR|x_1, x_2)$ is the probability of a thermal runaway with given predictors.

The parameters $\beta_0$, $\beta_1$, $\beta_2$ are empirically determined constant values.

Thus, the runaway predictor value is calculated in a simple, efficient, and accurate manner at the same time.

In a further development of the present embodiments, the state of charge value is calculated based on the general relation $$SOC = \left(1 - \frac{1}{C[Ah]} \int I dt\right) \cdot 100\%$$

For a thermal network model represented by an electric equivalent circuitry, an equivalent time dependent differential equation system is defined by the relation $$I^2 R(T_i, SOC) dt = C \frac{dT_i}{dt} + \sum_{i=0}^{N} \sum_{j}^{j \neq i} \frac{T_j - T_i}{R_{i,j}}$$

In the formula, the parameter I is a location index value of a location (e.g., of a single cell of the number of cells).

The parameter $R(T_i, SOC)$ is a resistance at a temperature $T_i$ and the state of charge value.

The parameter $T_i$, $T_j$ is a respective temperature with a temperature value 31-34 at the location with the location index value i.

The parameter SOC denotes a calculated state of charge value of the set of states.

The parameter C is a capacity value according to the electric equivalent circuitry.

Thus, the state of charge value is calculated in a simple, efficient, and accurate manner at the same time.

In an embodiment, the measured values of cell temperatures may be performed at predefined locations within the battery module as well as the instantaneous module current measurements. The locations for the temperature measurements may be directly on each cell, or on significantly fewer points.

In a further embodiment, only one single measurement point is used (e.g., at the center of the battery module).

In a further development, for each cell of the number of cells, at least one temperature value is captured. Thus, the temperature value is captured in a simple, efficient, and accurate manner at the same time.

As another example, a device including a current acquisition module that is configured to capture a set of currents is provided. The set of currents includes a respective cell current value for each cell of the number of cells. The device also includes a temperature acquisition module that is configured to capture a set of temperatures within the battery module. The set of temperatures includes at least one temperature value. The device includes a state of charge capturing module that is configured to capture a set of states. The set of state includes a respective state of charge value for each cell of the multiplicity of cells. The device also includes a resistance calculation module that is configured to derive a set of resistances using the temperature values of the set of temperatures and using the state of charge values of the set of states. The set of resistances includes a respective cell resistance value for each cell of the multiplicity of cells. The device includes a temperature prediction module that is configured to calculate a set of temperature predictors using the set of currents and the set of resistances. The set of temperature predictors includes at least one temperature prediction value that is estimated for a location within the battery module. The device also includes a runaway prediction module that is configured to calculate a set of runaway predictors using the set of currents, the set of temperatures, the set of resistances, and the set of temperature predictors. The set of runaway predictors includes a respective runaway predictor value for each cell of the number of cells. The device includes a warning module that is configured to set a warning indicator when at least one runaway predictor value of the set of runaway predictors exceeds a predefined threshold value. For each point in time and on a continuing basis, the device executes the method according to the present embodiments.

As yet another example, a battery system includes a battery module with a number of cells. The battery system further includes a detection device according to the present embodiments.

The cells of the number of cells of the battery system may further includes a respective current sensor that is connected to the current acquisition module.

The cells of the number of cells of the battery system may further include a respective temperature sensor that is connected to the temperature acquisition module.

As another example, an aircraft including a battery module with a number of cells, and a detection device according to the present embodiments is provided.

In one embodiment, the aircraft includes an electric propulsion system.

BRIEF DESCRIPTION OF THE DRAWINGS

FIG. 6 is a chart with predicted temperature characteristics during normal operation.

DETAILED DESCRIPTION

It is clear that further parts (not shown here) are to be provided for the device and for the execution of the method (e.g., devices for sensing and calculating). For the sake of better understanding, these parts are not illustrated and described.

Further, it is clear that the following modules are functional and need not to be physically separated units. The following modules may be formed by one or more processors.

Figure 1:
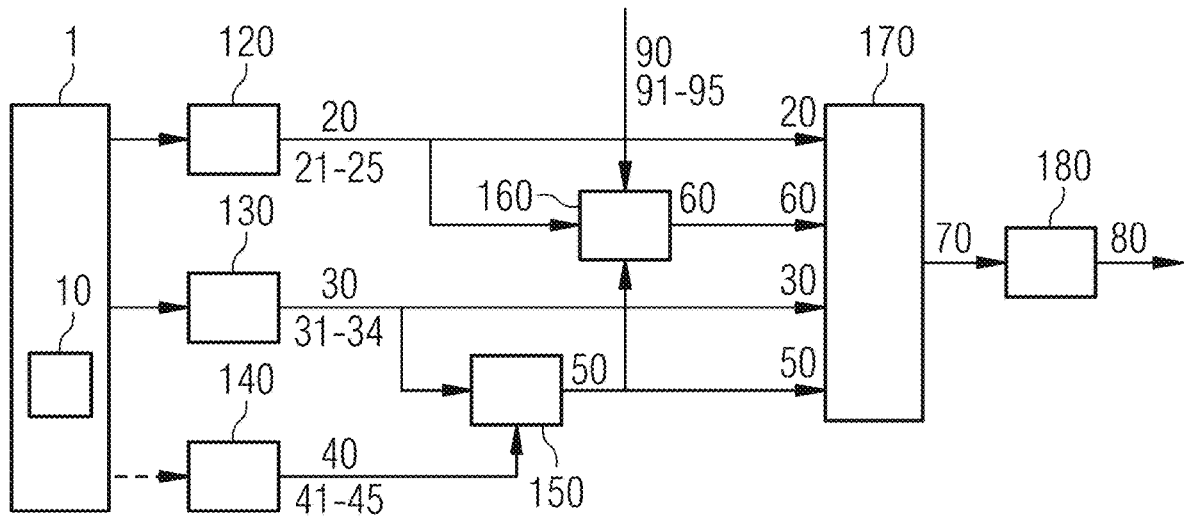
FIG. 1 is an embodiment of a flow chart of a method.

FIG. 1 shows an embodiment of a device according to the present embodiments that includes a battery module 1 with a multiplicity of cells 10 (e.g., a number of cells).

For example, the method may run on a device such as a controller or processor of a battery management system (BMS), which continuously calculates the probability of a thermal runaway event in the battery module 1 (e.g., during operation).

Inputs to the prediction method may include any number or combinations of thermal measurements both from battery cells or surrounding environment and measurements of the electrical parameters of the system.

The device according to the present embodiments includes a current acquisition module 120 that is configured to capture a set of currents 20. The set of currents 20 includes a respective cell current value 21-23 for each cell 11-15 of the number of cells 10.

The device further includes a temperature acquisition module 130 that is configured to capture a set of temperatures 30 within the battery module 1. The set of temperatures 30 includes at least one temperature value 31-34.

Further, the device includes a state of charge capturing module 140 that is configured to capture a set of states 40. The set of states 40 includes a respective state of charge value 41-45 for each cell 11-15 of the number of cells 10.

For example, the state of charge values 41-45 may be measured by a battery management system connected to the number of cells 10.

Alternatively, the state of charge values 41-45 may be inferred from current measurements of respective cells 11-15 and resistance values that may be determined by measured voltages and current values or may be extracted from a stored look-up table.

In addition, the device includes a resistance calculation module 150 that is configured to derive a set of resistances 50 using the temperature values 31-34 of the set of temperatures 30 and using the state of charge values 41-45 of the set of states 40. The set of resistances 50 includes a respective cell resistance value 51-55 for each cell 11-15 of the number of cells 10.

Further, the device includes a temperature prediction module 160 that is configured to calculate a set of temperature predictors 60 using the set of currents 20 and the set of resistances 50. The set of temperature predictors 60 includes at least one temperature prediction value 61-65 that is estimated for a location within the battery module 1.

Additionally, the device includes a runaway prediction module 170 that is configured to calculate a set of runaway predictors 70 using the set of currents 20, the set of temperatures 30, the set of resistances 50, and the set of temperature predictors 60. The set of runaway predictors 70 includes a respective runaway predictor value 71-75 for each cell 11-15 of the number of cells 10.

The device further includes a warning module 180 that is configured to set a warning indicator 80 in the case, if at least one runaway predictor value 71-75 of the set of runaway predictors 70 exceeds a predefined threshold value.

The device executes the following acts for each point in time and on a continuing basis: Capturing the set of temperatures 30 with the temperature values 31-34 within the battery module 1; capturing the set of states 40 with the state of charge values 41-45; deriving the set of resistances 50 with the cell resistance values 51-55 using the temperature values 31-34 of the set of temperatures 30 and using the state of charge values 41-45 of the set of states 40; calculating the set of temperature predictors 60 with the temperature prediction values 61-65 for a location within the battery module 1 using the set of currents 20 and the set of resistances 50; calculating the set of runaway predictors 70 with the runaway predictor values 71-75 using the set of currents 20, the set of temperatures 30, the set of resistances 50, and the set of temperature predictors 60, The warning indicator 80 is set in the case, if at least one runaway predictor value 71-75 of the set of runaway predictors 70 exceeds a predefined threshold value.

The temperature predictor values 61-65 may be calculated based on the relation $$T_{P,i} = T_{0,i} + \frac{1}{mC_p} \int_{t_0}^{t} I_M^2(i, t') R(i, t') dt' \text{ and}$$

$$T_P = [T_1 \ \ldots \ T_N] \in \mathbb{R}^N \text{ and } T_0 \in \mathbb{R}^N$$

where
i is a location index value of a location (e.g., of a single cell 11-15 of the number of cells 10);
$T_{P,i}$ is the temperature predictor value 61-65 of the set of temperature predictors 60 at the location with the location index i;

$T_{0,i}$ is the initial temperature value 91-95 of the set of initial temperatures 90 at the location with the location index i;

m is the mass subject to the load;

$C_p$ is the average specific heat value at the location with the location index i;

$I_M(i, t)$ is the measured current value 21-25 of the set of currents 20 at the location with the location index i and time t;

$R_M(i, t)$ is the measured resistance value 51-55 of the set of resistances 50 at the location with the location index i and time t.

$T_P$ is the vector with temperature predictor values 61-65, denoting the predicted module temperature at each measurement node. Under ideal conditions, only nominal Joule heating processes are present. For a single thermal source, heating a single capacitor element is determined accordingly.

$T_0$ is the vector with initial temperature values 91-95.

First, the difference between the temperature values 31-34 and temperature predictor values 61-65 are calculated, where the result provides an indicator of anomalous behavior in the battery pack. A respective large positive value indicates heating beyond the expected Joule-heating.

Since temperature predictor values 61-65 are determined via integration, it should be less sensitive to noise present in the measured temperature values 31-34.

A second predictor is determined independently of the temperature predictor values 61-65 and is given by the comparison of the local measured temperature values 31-34 to the temperatures at neighboring nodes.

The probability of a thermal runaway for given predictors may be modeled using a logistic regression model.

As an output of the model, the resulting probability may be compared to a threshold that may be determined empirically depending on the need for caution in the specific environment, in which the battery is being operated.

The runaway predictor values 71-75 may be calculated based on the general relation $$P(TR\,|\,x_1, x_2) = \frac{e^{\beta_0+\beta_1 x_1+\beta_2 x_2}}{1+e^{\beta_0+\beta_1 x_1+\beta_2 x_2}}$$

where

TR indicates a thermal runaway as the probability of interest; and $x_1, x_2$ are given predictors, inferred from the set of temperature predictors 60;

$P(TR|x_1,x_2)$ is the probability of a thermal runaway with given predictors; and $\beta_0, \beta_1, \beta_2$ are empirically determined constant values.

The first predictor $x_1$ indicates the difference between the predicted temperature and the measured temperature.

The second predictor $x_2$ indicates the average difference between a selected cell and all immediate neighboring cells.

An immediate neighboring cell to a first cell is the cell adjoining the first cell (e.g., a cell touching the first cell or a cell at least in close proximity of the first cell or when no other cell is in the line-of-sight between the cell and the first cell). Between a first cell and an immediate neighboring cell, a significant high physical interaction applies (e.g., by a thermal transfer).

The values of $\beta_0, \beta_1, \beta_2$ are determined by optimizing the estimator based on previously measured predictors $x_1, x_2$ from controlled experiments, which is done once only within an optimization process of $$\mathrm{argmin} \sum_{i=0}^{n}(P_i - \hat{P}_i)^2$$

where $P_i$ is the observed occurrence of a thermal runaway; and $\hat{P}_i$ is the predicted chance of observing a thermal runaway.

In a specific example, a battery module may include a number of interconnected battery cells, connected in series and in parallel to fulfill the electrical requirements.

A battery module may be cooled, for example, by air-cooling in an open box, by conductive cooling in a closed box, or liquid cooling (e.g., oil or water as cooling media).

Figure 2:
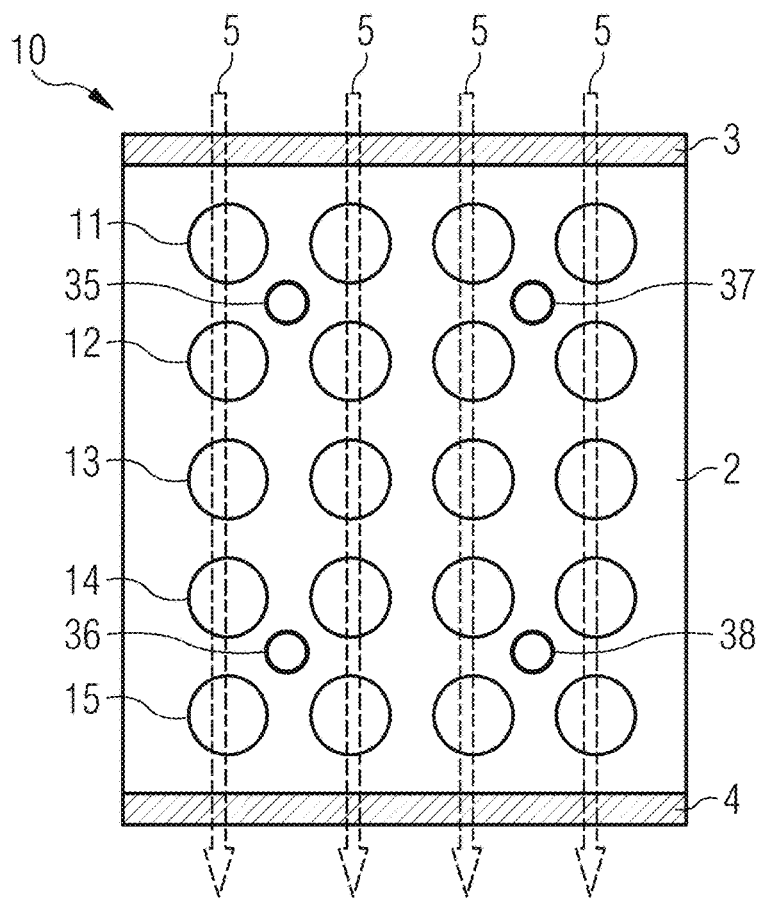
FIG. 2 is an embodiment of a symbolic representation of a battery module.

FIG. 2 depicts an embodiment of a symbolic representation of the battery module 1 with a number of cells 10.

All cells 11-15 of the number of cells 10 are arranged within a housing 2.

The housing 2 includes an air inlet 3 and an air outlet 4, so that a cooling airflow 5 may flow through the housing and thus, through or over the cells 11-15. In one embodiment, the housing 2 includes cooling fins in the area of the cooling airflow 5.

Within the housing 2, four temperature sensors 35-38 are arranged at different locations in close proximity of the respective cells 11-15 within the battery module 1 and configured to acquire the temperature values 31-34 of the set of temperatures 30.

Alternatively, for each cell of the number of cells 10, at least one temperature value 31-34 may be captured.

Figure 3:
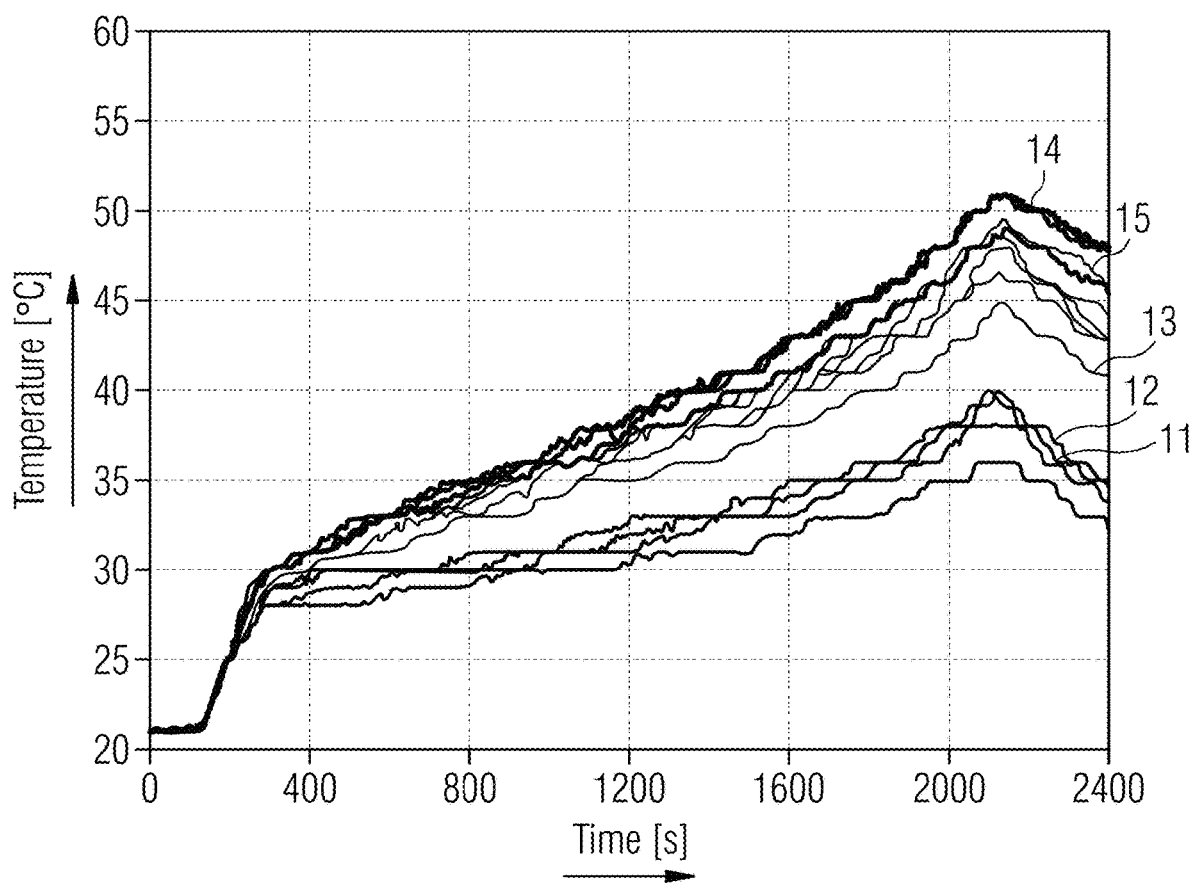
FIG. 3 is a chart with temperature measurements at a battery module.

FIG. 3 shows a chart with temperature measurements with exemplary temperature values 31-34 for the cells 11-15 within battery module 1. It is observable that the temperature values 31-34 rise over time after switching on, until the battery module 1 is switched off after 2100 s and cooled down.

The cells 11 and 12 are located close to the air inlet 3, which includes, in this embodiment, cooling fins, so that the cooling airflow 5 cools down efficiently the cells 11 and 12 and leads away corresponding heat.

Thus, the neighboring cell 13 is cooled by airflow 5 that is already warmed by cells 11, 12. Consequently, the cooling in less efficient than for cells 11, 12.

For the cells 14 and 15, the cooling airflow is further warmed up by the cell 13. Thus, the cooling performs less efficient for cells 14 and 15. Cell 15 is, however, located close to the air outlet 4, which includes, in this embodiment, cooling fins, and consequently, the cooling of cell 15 is slightly better than of cell 14.

As an example, a specific implementation of the method may be configured taking as inputs the measured values of cell temperatures as temperatures 31-34 at predefined locations within a battery module, the instantaneous module current measurement as the cell current values 21-25, and the expected cell resistance as the cell resistance values 51-55 at the current temperature and state of charge as the state of charge values 41-45. The locations for the temperature measurement may be directly on each cell, or on significantly fewer points. As a simple case, only one single measurement point may be used (e.g., at the center of the battery module).

Figure 4:
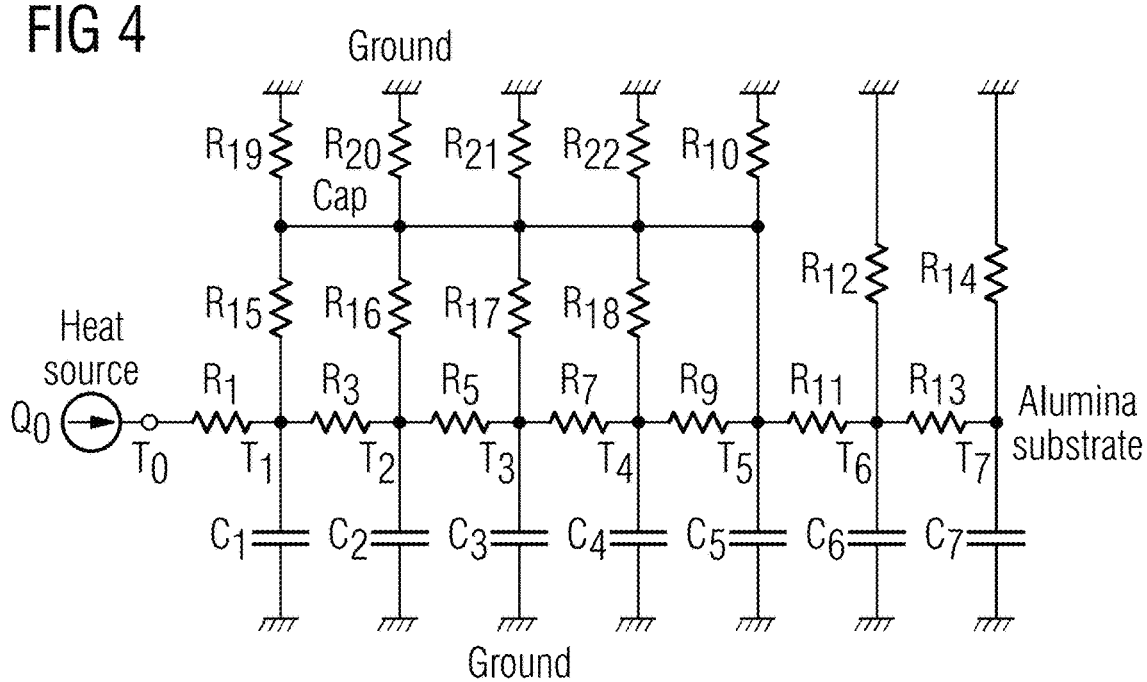
FIG. 4 is an equivalent circuitry of a thermal model of a battery module.

FIG. 4 shows an equivalent circuitry of a thermal model of a battery module. In general, based on FEM simulations and/or measurements, a thermal network model of the battery model may be defined. Such a Thermal Network Model may contain a finite number of nodes associated with specific physical points within the battery module including temperature measurement points, thermal resistances, heat capacities, and power generators. The cells generate heating power $P_{cell}=I^2 R$, have a significant heat capacity, and conduct the heat in an anisotropic way.

The entering node of this heat-flow into the thermal network model is associated, for example, with the center of the cell or may be distributed along the cell axis and enter in multiple nodes. Similarly, current connections may be modeled with thermal RC-ladders. In case of air-cooled current bars, for example, the heat transfer outwards the bar may be modeled with distributed thermal resistances.

The thermal RC-ladder may be described by resistors R1-R22, capacitors C1-C7, and temperatures T0-T7, as shown in FIG. 4.

A heat source $Q_0$ generates and feeds heat into the model. The cells of the battery model have a cap, which connects electrically some points of the RC-network.

The housing 2 constitutes an electrical ground, and an Alumina substrate, on which the cells are arranged, is arranged between parts of the housing 2.

Such a Thermal Network Model has power sources depending on the currents at the battery module, the state of charge- and temperature dependent internal resistances, thermal resistors with dependence and heat capacities. The thermal network model defines an equivalent time dependent differential equation system:

$$I^2 R(T_i, SOC) dt = C\frac{dT_i}{dt} + \sum_{i=0}^{N} \sum_{j}^{j \neq i} \frac{T_i - T_j}{R_{i,j}}$$

where
- i is a location index value of a location (e.g., of a single cell 11-15 of the number of cells 10);
- I is a current value 21-25 of the set of currents 20 at the location with the location index i and time t;
- $R(T_i, SOC)$ is a resistance at a temperature $T_i$ and the state of charge value 41-45;
- $T_i$, $T_j$ is a respective temperature with a temperature value 31-34 at the location with the location index value i;
- SOC is a calculated state of charge value 41-45 of the set of states 40; and
- C is a capacity value according to the electric equivalent circuitry.

This equation system may be solved in-situ (e.g., with a Newton-Raphson or a Runge-Kutta type solver) by the early-detection method that uses the current values 21-25, the measured temperature values 31-34, and the calculated state of charge values 41-45.

The state of charge values 41-45 may be calculated based on the general relation $$SOC = \left(1 - \frac{1}{C[Ah]} \int Idt\right) \cdot 100\%$$

Based on a predefined thermal model, the temperature prediction values 61-65 are calculated based on the measured value of the cell current values 21-25 and cell resistance values 51-55 and determine together the Joule heat generation $I_M^2 \cdot R(T, SOC)$, taking the initial temperature values 91-95 into account.

The temperature prediction values 61-65 at the specific measurement locations are subsequently compared to the measured temperatures 31-34 during operation.

The method calculates the probability of a thermal runaway event based on the instantaneous and historic deviation from the expected temperature due to ohmic processes.

The method delivers $T_i(t)$ temperatures of the nodes (e.g., cells over time). This includes the temperature prediction values 61-65 as a subset, which goes into the thermal runaway-predictor beside measured temperature values 31-34.

In FIG. 4, the temperature behavior of the nearby cells may indicate the presence of a thermal runaway within the battery module.

Figure 5:
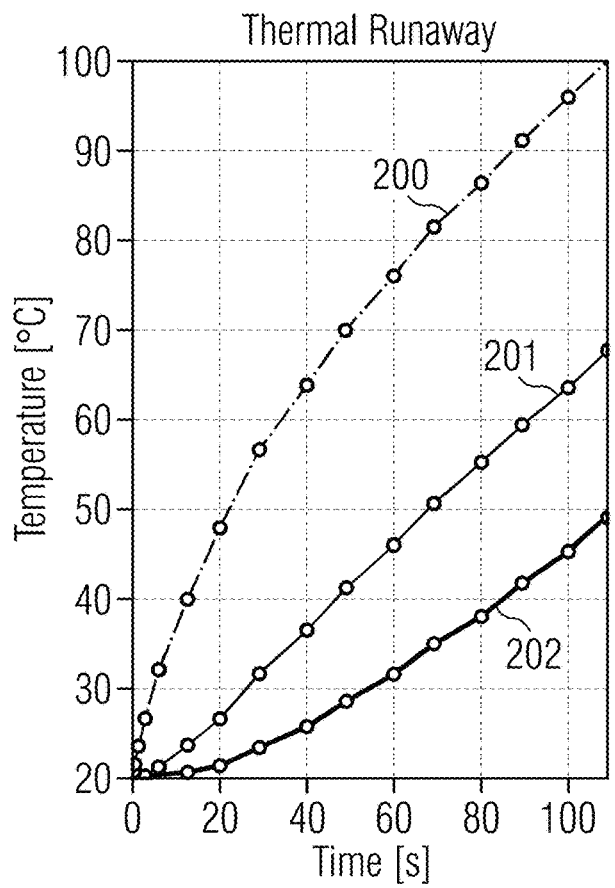
FIG. 5 is a chart with predicted temperature characteristics during thermal runaway of the central cell.

A chart with predicted temperature characteristics during a thermal runaway is shown in FIG. 5 and during normal operation in FIG. 6.

A central cell 200 is located centrally within a battery module. A 1st nearest neighbor cell 201 is located close to the central cell 200. A 2nd nearest neighbor cell 202 is located slightly more apart from central cell 200 than cell 201.

The chart depicts the rise of temperatures in the central cell 200, in the 1st and 2nd nearest neighbor cells 201, 202.

The device according to the present embodiments may be used within a battery system including a battery module 1 with a number of cells 10.

Further, the device according to the present embodiments may be used within an aircraft (e.g., an aircraft with an electric propulsion system including the battery module 1 with a number of cells 10).

The present embodiments are not restricted to the specific embodiments described in detail herein, but encompasses all variants, combinations, and modifications thereof that fall within the framework of the appended claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for detecting a thermal runaway of a battery module with a number of cells, the method comprising:
    on a continuing basis, for each point in time:
        capturing a set of currents, the set of currents comprising a respective cell current value for each cell of the number of cells;
        capturing a set of temperatures within the battery module, the set of temperatures comprising at least one temperature value;
        capturing a set of states, the set of states comprising a respective state of charge value for each cell of the number of cells;

deriving a set of resistances using the at least one temperature value of the set of temperatures and using the state of charge values of the set of states, the set of resistances comprising a respective cell resistance value for each cell of the number of cells;

calculating a set of temperature predictors using the set of currents and the set of resistances, the set of temperature predictors comprising at least one temperature prediction value that is estimated for a location within the battery module; and calculating a set of runaway predictors using the set of currents, the set of temperatures, the set of resistances, and the set of temperature predictors, the set of runaway predictors comprising a respective runaway predictor value for each cell of the number of cells; and setting a warning indicator when at least one runaway predictor value of the set of runaway predictors exceeds a predefined threshold value.

2. The method of claim 1, wherein the set of temperatures comprises at least two temperature values that are measured at different locations within the battery module.

3. The method of claim 1, wherein the temperature predictor value is calculated based on the relation $$T_{P,i} = T_{0,i} + \frac{1}{mC_p} \int_{t_0}^{t} I_M^2(i, t')R(i, t')dt' \text{ and}$$

$$T_P = [T_1 \ \dots \ T_N] \in \mathbb{R}^N \text{ and } T_0 \in \mathbb{R}^N$$

wherein:
i is a location index value of a location of a single cell of the number of cells;
$T_{P,i}$ is the temperature predictor value of the set of temperature predictors at the location with the location index;
$T_{0,i}$ is the initial temperature value of the set of initial temperatures at the location with the location index I;
m is a mass subject to the load;
$C_p$ is an average specific heat value at the location with the location index i;
$I_M(i, t)$ is the measured current value of the set of currents at the location with the location index i and time t; and
$R_M(i, t)$ is the measured resistance value of the set of resistances at the location with the location index i and time t.

4. The method of claim 1, wherein the runaway predictor value is calculated based on the general relation $$P(TR \mid x_1, x_2) = \frac{e^{\beta_0 + \beta_1 x_1 + \beta_2 x_2}}{1 + e^{\beta_0 + \beta_1 x_1 + \beta_2 x_2}}$$

wherein:
$T_R$ indicates a thermal runaway as the probability of interest;
$x_1$, $x_2$ are given predictors, inferred from the set of temperature predictors;
$P(TR|x_1, x_2)$ is a probability of a thermal runaway with given predictors; and
$\beta_0$, $\beta_1$, $\beta_2$ are empirically determined constant values.

5. The method of claim 1, wherein the state of charge value is calculated based on the general relation $$SOC = \left(1 - \frac{1}{C[Ah]} \int I dt\right) \cdot 100\%$$

wherein for a thermal network model represented by an electric equivalent circuitry, an equivalent time dependent differential equation system is defined by the relation $$I^2 R(T_i, SOC)dt = C\frac{dT_i}{dt} + \sum_{i=0}^{N} \sum_{j}^{j \neq i} \frac{T_i - T_j}{R_{i,j}}$$

wherein:
i is a location index value of a location of a single cell of the number of cells;
I is a current value of the set of currents at the location with the location index i and time t;
$R(T_i, SOC)$ is a resistance at a temperature $T_i$ and the state of charge value;
$T_i$, $T_j$ is a respective temperature with a temperature value at the location with the location index value i;
SOC is a calculated state of charge value of the set of states; and
C is a capacity value according to the electric equivalent circuitry.

6. The method of claim 1, wherein for each cell of the number of cells, at least one temperature value is captured.

7. A device for detecting a thermal runaway of a battery module with a number of cells, the device comprising:
a current acquisition module that is configured to capture a set of currents, the set of currents comprising a respective cell current value for each cell of the number of cells; and
a temperature acquisition module that is configured to capture a set of temperatures within the battery module, the set of temperatures comprising at least one temperature value;
a state of charge capturing module that is configured to capture a set of states, the set of states comprising a respective state of charge value for each cell of the number of cells;
a resistance calculation module that is configured to derive a set of resistances using the at least one temperature value of the set of temperatures and using the state of charge values of the set of states, the set of resistances comprising a respective cell resistance value for each cell of the number of cells;
a temperature prediction module that is configured to calculate a set of temperature predictors using the set of currents and the set of resistances, the set of temperature predictors comprising at least one temperature prediction value that is estimated for a location within the battery module;
a runaway prediction module that is configured to calculate a set of runaway predictors using the set of currents, the set of temperatures, the set of resistances, and the set of temperature predictors, the set of runaway predictors comprising a respective runaway predictor value for each cell of the number of cells; and
a warning module that is configured to set a warning indicator when at least one runaway predictor value of the set of runaway predictors exceeds a predefined threshold value.

wherein the device is configured to, for each point in time and on a continuing basis, execute the capture of the set of currents, the capture of the set of temperatures, the capture of the set of states, the derivation, the calculation of the set of temperature predictors, the calculation of the set of runaway predictors, and the set of the warning indicator.

8. A battery system comprising:
a battery module comprising a number of cells; and
a detection device for detecting a thermal runaway of the battery module, the device comprising:
   a current acquisition module that is configured to capture a set of currents, the set of currents comprising a respective cell current value for each cell of the number of cells;
   a temperature acquisition module that is configured to capture a set of temperatures within the battery module, the set of temperatures comprising at least one temperature value;
   a state of charge capturing module that is configured to capture a set of states, the set of states comprising a respective state of charge value for each cell of the number of cells;
   a resistance calculation module that is configured to derive a set of resistances using the at least one temperature value of the set of temperatures and using the state of charge values of the set of states, the set of resistances comprising a respective cell resistance value for each cell of the number of cells;
   a temperature prediction module that is configured to calculate a set of temperature predictors using the set of currents and the set of resistances, the set of temperature predictors comprising at least one temperature prediction value that is estimated for a location within the battery module;
   a runaway prediction module that is configured to calculate a set of runaway predictors using the set of currents, the set of temperatures, the set of resistances, and the set of temperature predictors, the set of runaway predictors comprising a respective runaway predictor value for each cell of the number of cells; and
   a warning module that is configured to set a warning indicator when at least one runaway predictor value of the set of runaway predictors exceeds a predefined threshold value,
wherein the device is configured to, for each point in time and on a continuing basis, execute the capture of the set of currents, the capture of the set of temperatures, the capture of the set of states, the derivation, the calculation of the set of temperature predictors, the calculation of the set of runaway predictors, and the set of the warning indicator.

9. An aircraft comprising:
a battery module comprising a number of cells; and
a detection device for detecting a thermal runaway of the battery module, the device comprising:
   a current acquisition module that is configured to capture a set of currents, the set of currents comprising a respective cell current value for each cell of the number of cells;
   a temperature acquisition module that is configured to capture a set of temperatures within the battery module, the set of temperatures comprising at least one temperature value;
   a state of charge capturing module that is configured to capture a set of states, the set of states comprising a respective state of charge value for each cell of the number of cells;
   a resistance calculation module that is configured to derive a set of resistances using the at least one temperature value of the set of temperatures and using the state of charge values of the set of states, the set of resistances comprising a respective cell resistance value for each cell of the number of cells;
   a temperature prediction module that is configured to calculate a set of temperature predictors using the set of currents and the set of resistances, the set of temperature predictors comprising at least one temperature prediction value that is estimated for a location within the battery module;
   a runaway prediction module that is configured to calculate a set of runaway predictors using the set of currents, the set of temperatures, the set of resistances, and the set of temperature predictors, the set of runaway predictors comprising a respective runaway predictor value for each cell of the number of cells; and
   a warning module that is configured to set a warning indicator when at least one runaway predictor value of the set of runaway predictors exceeds a predefined threshold value,
wherein the device is configured to, for each point in time and on a continuing basis, execute the capture of the set of currents, the capture of the set of temperatures, the capture of the set of states, the derivation, the calculation of the set of temperature predictors, the calculation of the set of runaway predictors, and the set of the warning indicator.

10. The aircraft of claim 9, further comprising an electric propulsion system.

11. The aircraft of claim 9, wherein the set of temperatures comprises at least two temperature values that are measured at different locations within the battery module.

12. The aircraft of claim 9, wherein for each cell of the number of cells, at least one temperature value is captured.

13. The device of claim 7, wherein the set of temperatures comprises at least two temperature values that are measured at different locations within the battery module.

14. The device of claim 7, wherein for each cell of the number of cells, at least one temperature value is captured.

15. The battery of claim 8, wherein the set of temperatures comprises at least two temperature values that are measured at different locations within the battery module.

16. The battery of claim 8, wherein for each cell of the number of cells, at least one temperature value is captured.

17. The method of claim 2, wherein the set of temperatures comprises one temperature value for each cell of the number of cells that is measured at or in close proximity of the respective cell within the battery module.

* * * * *